Nov. 27, 1956  P. F. DI COSTANZO  2,771,755
SPAGHETTI BOWL
Filed Sept. 14, 1953
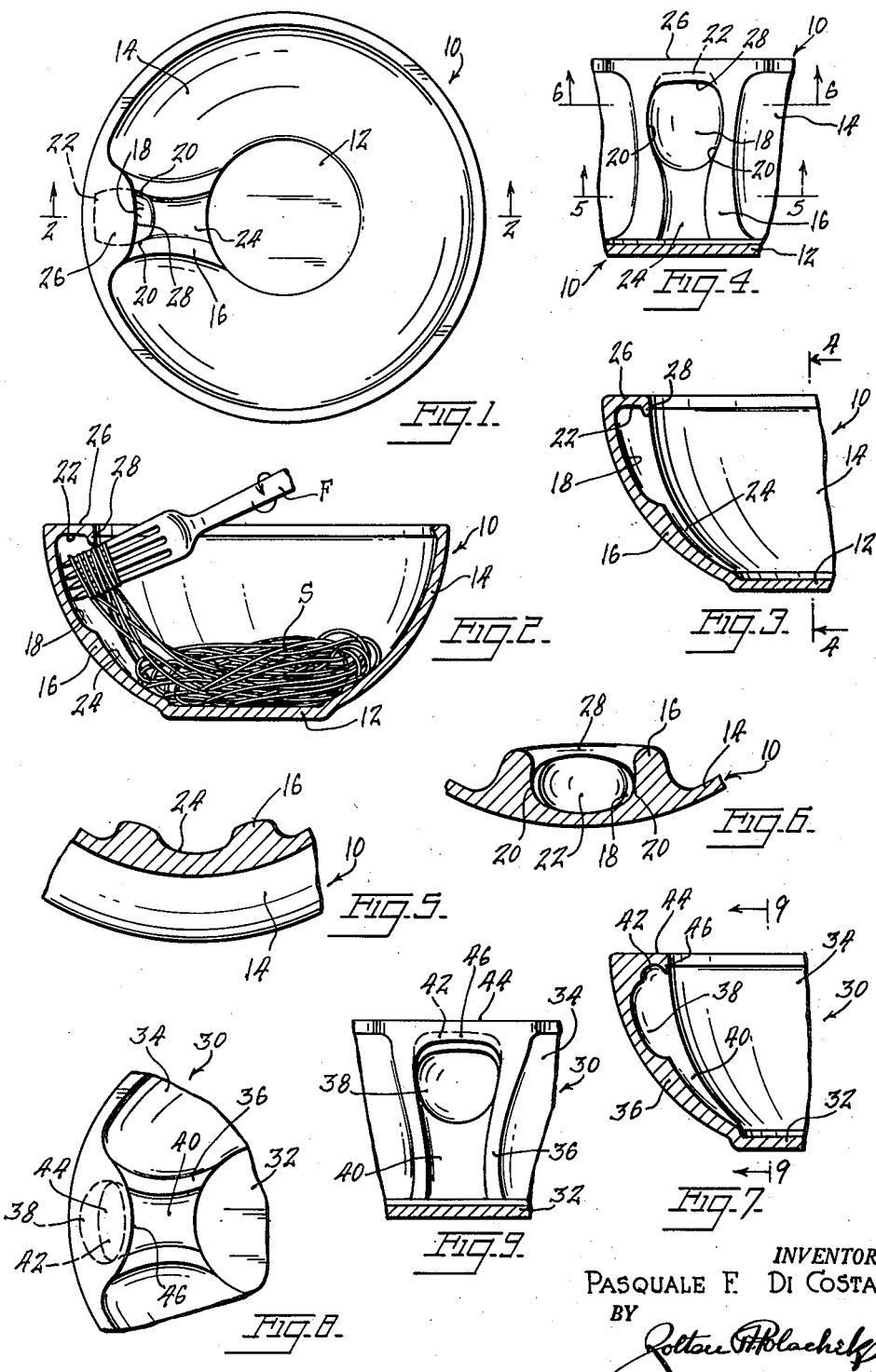
INVENTOR.
PASQUALE F. DI COSTANZO
BY
ATTORNEY United States Patent Office 2,771,755
Patented Nov. 27, 1956

2,771,755

SPAGHETTI BOWL

Pasquale F. Di Costanzo, New York, N. Y.

Application September 14, 1953, Serial No. 379,922

3 Claims. (Cl. 65—15)

This invention relates to a bowl or dish, so designed as to particularly facilitate the eating of spaghetti therefrom.

The eating of a quantity of spaghetti presents certain problems deriving from the length of the individual strands or pieces. Spaghetti devotees prefer not to cut the spaghetti into small pieces and, accordingly, have found that the most efficient way of eating spaghetti is to coil the same about a fork. The common practice is to use, in association with the fork, a tablespoon, and one will generally impale a selected quantity of spaghetti upon the fork within the bowl, after which the fork is lifted to engage the end thereof in the spoon. With the spoon as a base or support held out of the main quantity of spaghetti that remains within the bowl, the eater rapidly twirls or rotates the fork against the spoon, to wind the spaghetti about the fork tines until the selected quantity is coiled into a compact mass having no dangling strands, which compact mass can be eaten neatly and without difficulty.

Considerable dexterity is necessary in eating spaghetti in the manner referred to above, and such dexterity is usually acquired only after considerable practice.

The main object of the present invention, in view of the above, is to provide a spaghetti bowl, that will include a depression or concavity disposed above the normal level of the spaghetti within the bowl, with said depression being approximately spoon-shaped, so as to permit one to shift the impaled spaghetti and the fork carrying the same directly thereinto, thus to allow the fork to be thereafter rotated to wind the spaghetti. The need for a spoon, and for the dexterity normally required in the manipulation of the spoon simultaneously with the fork, is thus completely eliminated.

Another object of importance is to provide a spaghetti bowl as described, which will be particularly adapted to be used in Italian restaurants so as to allow the patrons of such establishments to eat spaghetti in the accepted, most efficient manner, without requiring said patrons to acquire the skill that has heretofore been involved in the consumption of this particular food.

Still another object is to provide a spaghetti bowl wherein the depression within which the spaghetti is wound will be in communication with a trough or guideway leading from the bottom of the bowl, thus to allow one to guide a fork having thereon a quantity of spaghetti directly from the bowl bottom to said depression. It is proposed, in this manner, to insure against spilling of the spaghetti over the side of the bowl, and it is further proposed to insure that splashing of the sauce will be reduced to a minimum.

In carrying out another object of the invention, it is proposed to provide, in association with the depression, an overhang or lip so located and proportioned as to insure that no wound spaghetti will dangle from the end of the fork when the fork is to be lifted to one's mouth.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top plan view of a spaghetti bowl formed in accordance with the invention.

Fig. 2 is a sectional view on line 2—2 of Fig. 1, wherein a quantity of spaghetti and a fork used in eating the same are shown.

Fig. 3 is an enlarged, fragmentary sectional view on the same cutting plane as Fig. 2.

Fig. 4 is a fragmentary sectional view taken substantially on line 4—4 of Fig. 3.

Fig. 5 is an enlarged, detail sectional view on line 5—5 of Fig. 4.

Fig. 6 is an enlarged, detail sectional view on line 6—6 of Fig. 4.

Fig. 7 is a view similar to Fig. 3 showing a modified form.

Fig. 8 is a fragmentary top plan view of the bowl shown in Fig. 7.

Fig. 9 is a sectional view taken substantially on line 9—9 of Fig. 7.

The reference numeral 10 has been applied generally in the drawing to designate a spaghetti bowl formed in accordance with the invention. So far as its general shape is concerned, the bowl is basically conventional, and includes a flat bottom 12 and an upwardly flaring side wall 14. The depth of the bowl or plate is subject to variation without departure from the spirit of the invention as hereinafter claimed, and further, the bowl might be equipped with a circumferentially extending ledge at its top, if desired. The particular bowl shape used in the drawing is to be considered as purely illustrative and not necessarily restrictive.

In any event, the side wall 14 is formed with a thickened portion 16 extending from the bowl bottom to the top edge of the bowl. The thickened portion is increased progressively in thickness in a direction away from the bowl bottom and is formed, in spaced relation to the bowl bottom, with a depression or concavity 18. This is approximately spoon-shaped, and includes outwardly curved side walls 20 merging into an inner end wall 22. The bottom of the concavity can be planiform, if desired, or can alternatively be slightly depressed along curving lines, as best shown in Figs. 2, 3 and 6, so as to further aid in producing the spoon-like configuration to the depression. It is important to note that regardless of the particular shape of the depression 18, there should be no sharp corners or inaccessible crevices therein, since food would tend to lodge therein in a manner that would make removal of the same difficult when the bowl is being washed. This would, of course, be wholly undesirable from the standpoint of maintaining high sanitary standards.

That end of the depression remote from the inner end wall 22 is in communication with a trough or channel 24 extending longitudinally and centrally of the thickened portion from the depression to the bowl bottom. The trough is not as great in depth as the depression 18, since it is desired that a fork F be capable of rotation within the depression without danger of said fork slipping downwardly out of the depression into the main mass of spaghetti S, that covers the bottom of the bowl.

In some commercial embodiments of the invention it might be desired to provide the depression, but not the trough, in which event the depression would be formed in the bowl side wall in spaced relation to the bowl bottom. The depression in this instance would not be in communication with a guide trough, but would instead be formed directly within the inner surface of the bowl, the bowl side wall being either thickened or left as its ordinary main thickness in the region of the depression, whichever might be desired.

The inner end wall of the depression defines the inside or under surface of an approximately horizontally disposed overhang 26 extending inwardly from the edge of the bowl for a short distance as best shown in Figs. 1 and 3. Overhang 26 is coplanar with the top edge of the bowl and has tapered ends merging into said top edge.

The overhang 26, as shown in Fig. 3, is integrally formed with a depending lip 28 covering the upper end portion of the depression and extending the full width of the same.

In use of the form of the invention shown in Figs. 1–6, one would first impale on the tines of the fork F a number of strands of the spaghetti S within the bottom of the bowl. Then, the fork can be slidably shifted up the trough or channel 24 into the depression 18, and there rotated as shown by the arrow in Fig. 2. Twirling of the fork in this manner will be effective to coil the strands of spaghetti about the tines of the fork, until there remains within the depression a compact mass carried by the fork and having no dangling ends. This can be raised to the mouth directly from the depression, after which the operation is repeated.

The function of the lip is of importance. The lip can be used in any of various ways, in discharging its main functions. First, the lip can serve as an abutment which will prevent the spaghetti from winding in the direction of the outer ends of the tines, thus to confine the compactly coiled strands within a space disposed well inwardly from the outer tine ends. Alternatively, the lip can be used to force off the fork any undesired strands coiled thereupon, thus to hold the coil of spaghetti to a desired size. Still further, the lip is relatively sharp and can thus be used as a knife-like member which can be employed advantageously in cutting strands that prove to be of too great a length.

In Figs. 7–9, there is shown a second form of the invention wherein the bowl has been designated generally by the reference numeral 30 and includes a bowl bottom 32 merging into a flaring side wall 34. A thickened part 36 is similar in outline and depth to the thickened portion 16 in the first form of the invention, and has a spoon-like depression 38 adjacent its upper end. The depression 38 is formed in the bottom wall of a trough or guide channel 40 intermediate the ends of said guide channel adjacent the upper end of the channel. The channel, at its upper end, is closed by an end wall 42 that defines the underside of an overhang 44. Overhang 44 merges into a lip 46.

In the second form of the invention, the depression is located between the ends of the trough, as distinguished from the first form, wherein the depression is disposed beyond one end of said trough. By locating the depression in the manner shown in Fig. 7, the lip is offset outwardly from the depression. This permits one to use or not use the lip, as desired, and it is not necessary that the spaghetti be coiled upon the fork in closely spaced relation to the lip.

The trough might be eliminated in the second form of the invention, as in the first form, and if the trough is eliminated, the lip can be formed upon an overhang extending inwardly from the edge of the bowl, with the depression being formed in the inner surface of the side wall of the bowl wall.

In both forms of the invention, there is the common characteristic wherein the spaghetti fork can be brought up to a spoon-like depression and rotated in the same manner as it is now rotated upon a spoon. The proper coiling of the spaghetti is, as a result, measurably facilitated, and there is, at the same time, no need for a spoon or for the dexterity heretofore required in the use of the same.

Although it has not been deemed necessary to illustrate herein a form of the invention wherein there is more than one depression provided in the same bowl, it will be obvious that any number of depressions could be formed in the bowl wall. This construction might be desirable for large bowls used at the center of a table, from which smaller individual portions are taken.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A spaghetti bowl comprising a dished body having a depression spaced from the bottom thereof and adapted to receive the end portions of the prongs of a fork for rotation of the end portions in said depression, and an overhang extending inwardly from the edge of the body above the depression to provide means adapted to prevent spillage of food from the bowl during rotation of the end portions of the prongs of the fork within the depression, said overhang merging into a depending lip with said lip being of blade-like formation to provide a knife-like abutment for removing excess spaghetti from the fork, the lip being offset outwardly from the depression to expose the entire area of said depression.

2. The combination of claim 1, wherein the upper surface of said overhang is coplanar with the top edge of the bowl.

3. The combination of claim 2, wherein said body has a thickened portion, said thickened portion having a downwardly extending channel communicating with said depression, and the upper edge of the depression and the edge of the depending lip lie substantially in the same plane.

References Cited in the file of this patent

UNITED STATES PATENTS

| | | |
|---|---|---|
| D. 5,900 | Atterbury et al. | June 4, 1872 |
| D. 117,898 | Carawan | Dec. 5, 1939 |
| 229,158 | Mander | June 22, 1880 |
| 879,364 | Cohen | Feb. 18, 1908 |
| 1,123,793 | Pick | Jan. 5, 1915 |
| 1,143,879 | Allspaw | June 22, 1915 |
| 1,168,027 | Nirdlinger | Jan. 11, 1916 |
| 1,220,495 | Cadby | Mar. 27, 1917 |
| 1,272,996 | Poschadel | July 16, 1918 |
| 1,316,314 | Mao | Sept. 16, 1919 |
| 1,321,145 | Price | Nov. 11, 1919 |
| 1,520,402 | Clemans | Dec. 23, 1924 |
| 1,756,963 | Ware | May 6, 1930 |
| 2,023,703 | Sehlbach | Dec. 10, 1935 |
| 2,170,311 | Smith | Aug. 22, 1939 |
| 2,395,084 | Wolf | Feb. 19, 1946 |
| 2,474,995 | Wade | July 5, 1949 |
| 2,625,020 | Oliver | Jan. 13, 1953 |

FOREIGN PATENTS

| | | |
|---|---|---|
| 176,879 | Switzerland | July 16, 1935 |
| 782,971 | France | Mar. 25, 1935 |